United States Patent
Nitta et al.

(10) Patent No.: US 7,501,802 B2
(45) Date of Patent: Mar. 10, 2009

(54) DC-DC CONVERTING METHOD AND APPARATUS

(75) Inventors: Shoichi Nitta, Osaka-fu (JP); Masahiro Matsuo, Hyogo-ken (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 11/723,723

(22) Filed: Mar. 21, 2007

(65) Prior Publication Data

US 2008/0007232 A1    Jan. 10, 2008

Related U.S. Application Data

(63) Continuation of application No. 11/153,544, filed on Jun. 16, 2005, now Pat. No. 7,202,644.

(30) Foreign Application Priority Data

Jun. 16, 2004   (JP)   ............................. 2004-178323

(51) Int. Cl.
  *G05F 1/62*   (2006.01)
  *G05F 1/618*  (2006.01)
(52) U.S. Cl. .................. 323/259; 323/225; 323/271; 323/284
(58) Field of Classification Search .............. 323/225, 323/259, 268, 282, 284, 285, 344
See application file for complete search history.

(56) References Cited

U.S. PATENT DOCUMENTS

| 6,166,527 | A  |         | 12/2000 | Dwelley et al. |
| 6,348,781 | B1 | *       | 2/2002  | Midya et al. ................. 323/224 |
| 6,788,033 | B2 | *       | 9/2004  | Vinciarelli ................... 323/225 |
| 6,894,467 | B2 |         | 5/2005  | Pons et al. |
| 6,958,595 | B2 |         | 10/2005 | Niiyama et al. |
| 6,979,985 | B2 |         | 12/2005 | Yoshida et al. |
| 7,023,190 | B2 |         | 4/2006  | Chapuis |
| 7,129,680 | B2 | *       | 10/2006 | Higashitani et al. ......... 323/224 |
| 7,202,644 | B2 | *       | 4/2007  | Nitta et al. ................... 323/259 |
| 2005/0052887 | A1 |      | 3/2005  | Matsuo et al. |

FOREIGN PATENT DOCUMENTS

JP       2000-166223       6/2000

* cited by examiner

*Primary Examiner*—Gary L Laxton
(74) *Attorney, Agent, or Firm*—Dickstein Shapiro LLP

(57) ABSTRACT

A DC-DC converting apparatus including a step-up and step-down circuit stepping up/down an input voltage to generate an output voltage and a PWM control circuit. The PWM control circuit generates an error signal, first to third voltages, a first triangular wave signal varying between the first and second voltages, and a second triangular wave signal varying between the third voltage and a fourth voltage determined based on the first to third voltages. The PWM control circuit compares the error signal with the first and second triangular wave signals and causes the step-up and step-down circuit to step up/down the input voltage based on the comparison. The first to fourth voltages V1 to V4 satisfy V1<V4<V2<V3 and V4=V3−(V2−V1). At least one of the first to third voltages is variably set to make a time in which voltage ranges of the first and second triangular wave signals overlap longer than a delay time caused by the comparison.

22 Claims, 8 Drawing Sheets

US 7,501,802 B2

DC-DC CONVERTING METHOD AND APPARATUS

CROSS REFERENCE TO RELATED APPLICATIONS

This application is a continuation of U.S. patent application Ser. No. 11/153,544, filed on Jun. 16, 2005 now U.S. Pat. No. 7,202,644, the entire disclosure of which is hereby incorporated by reference in its entirety.

BACKGROUND OF THE INVENTION

This patent application is based on and claims priority to Japanese patent application No. 2004-178323 filed on Jun. 16, 2004 in the Japan Patent Office, the entire contents of which are incorporated by reference herein.

The invention relates to a DC-DC (direct current to direct current) converting method and apparatus, and more particularly to a DC-DC converting method and apparatus which stably performs step-up and step-down conversions by suitably setting a voltage range where a voltage range of a triangular wave signal used for a step-up control overlaps a voltage range of a triangular wave signal used for a step-down control.

DISCUSSION OF THE BACKGROUND

In recent years, small-size mobile equipment, such as a mobile phone has been widely used. Such small-size mobile equipment includes a small-size rechargeable battery as a power source. To downsize batteries and extend their operation time, attempts have been made to improve battery performance and to reduce electric power consumption in small-size mobile equipment. Further, it is desirable to widen a usable voltage range of batteries to reduce the number of batteries and make them usable for a longer time. Therefore, some power supply circuits are provided with a step-up and step-down DC-DC converter capable of supplying a load with a constant voltage even when a voltage provided by the battery exceeds or falls below a voltage level required by the load. The step-up and step-down DC-DC converter is not selective in power supply voltage and thus can adapt to a variety of power input such as a battery and an AC (alternating current) adapter.

FIG. 1 illustrates a configuration of a background step-up and step-down DC-DC converter 100. The step-up and step-down DC-DC converter 100 includes an input terminal IN for receiving an input voltage VB, an output terminal OUT for outputting a predetermined output voltage Vout, a PWM (pulse-width modulation) control circuit 101, and a step-up and -down circuit 102.

The step-up and step-down circuit 102 includes an inductor La, a capacitor Ca, and transistors Ma to Md.

The PWM control circuit 101 includes an error amplifier circuit 111, a triangular wave generation circuit 112, a step-down comparator circuit CMPa, a step-up comparator circuit CMPb, a control circuit 113, and a predriver 114.

The error amplifier circuit 111 includes an operational amplifier circuit AMPa, a reference voltage generation circuit 117, resistors R110 and R111, and a feedback resistor R112. The reference voltage generation circuit 117 generates and outputs a predetermined reference voltage Vref. The resistors R110 and R111 divide the output voltage Vout and generate a feedback voltage VFB. The operational amplifier circuit AMPa compares the reference voltage Vref with the feedback voltage VFB, and generates and outputs an error signal Sa based on the result of the comparison.

The triangular wave generation circuit 112 includes a first triangular wave generation circuit 121, a second triangular wave generation circuit 122, a constant current source 123, a battery 124, and resistors R101 to R103. The first triangular wave generation circuit 121 generates a first triangular wave signal TWa used for performing a step-down control, and the second triangular wave generation circuit 122 generates a second triangular wave signal TWb used for performing a step-up control.

The first triangular wave generation circuit 121 receives a first voltage Va used for setting a lower limit voltage of the first triangular wave signal TWa, a second voltage Vb used for setting an upper limit voltage of the first triangular wave signal TWa, and current output from the constant current source 123 and used for setting a gradient of a waveform of the first triangular wave signal TWa.

The second triangular wave generation circuit 122 receives a third voltage Vc used for setting an upper limit voltage of the second triangular wave signal TWb, current output from the constant current source 123 and used for setting a gradient of the second triangular wave TWb, and a clock signal CLKa output from the first triangular wave generation circuit 121 to be used for synchronizing actions of the second triangular wave generation circuit 122. The currents input from the constant current source 23 to the first and second triangular wave generation circuits 121 and 122 are equal in value.

As illustrated in a timing diagram of FIG. 2, the first triangular wave signal TWa forms a triangular waveform which varies between the first voltage Va and the second voltage Vb, while the second triangular wave signal TWb forms a triangular waveform which varies between the third voltage Vc and the fourth voltage Vd.

When the first triangular wave signal TWa reaches the first voltage Va (i.e., the lower limit voltage of the first triangular wave TWa), the first triangular wave generation circuit 121 outputs the clock signal CLKa to the second triangular wave generation circuit 122. Upon input of the clock signal CLKa to the second triangular wave generation circuit 122, the voltage of the second triangular wave signal TWb which has been decreasing starts to increase.

The gradients of the first and second triangular wave signals TWa and TWb are determined by the value of the current output from the constant current source 123. Therefore, the first and second triangular wave signals TWa and TWb have equal amplitudes. A fourth voltage Vd, which is a lower limit voltage of the second triangular wave signal TWb, is a voltage obtained by subtracting a voltage difference between the second and first voltages Vb and Va from the third voltage Vc.

The fourth voltage Vd should be lower than the second voltage Vb to smooth the switching between the step-up operation and the step-down operation performed in the step-up and step-down DC-DC converter 100. In other words, a voltage range of the first triangular wave signal TWa used for the step-down control should partly overlap a voltage range of the second triangular wave signal TWb used for the step-up control.

In a recent attempt to further reduce mobile equipment size and power consumption, a PWM control frequency of a step-up and step-down DC-DC converter is increased. If the PWM control frequency is increased, the inductor La and the capacitor Ca which occupy space of the step-up and step-down DC-DC converter may be downsized, and power efficiency may be improved. The increase of the PWM control frequency is, therefore, effective in reducing electric power consumption.

If the PWM control frequency is increased, however, time periods Ta and Tb shown in FIG. 2, in which the voltage range of the first triangular wave signal TWa overlaps the voltage range of the second triangular wave signal TWb, are reduced.

As illustrated in FIG. 3, both the step-down comparator circuit CMPa and the step-up comparator circuit CMPb have two types of delay time periods, i.e., first delay time periods TDa and TDb and second delay time periods Tr and Tf. In the first delay time periods TDa and TDb, two input voltages input into the comparator circuit, reverse in voltage levels, and affect the signal output from the comparator circuit. In the second delay time period Tr, which is a rise time of an output signal output from the comparator circuit, the output signal output from the comparator circuit increases from a relatively low level (LOW) and reaches a relatively high level (HIGH). Meanwhile, in the second delay time period Tf, which is a fall time of the output signal output from the comparator circuit, the output signal output from the comparator circuit decreases from the HIGH level and reaches the LOW level.

If each of the time periods Ta and Tb (i.e., the time periods in which the voltage range of the first triangular wave signal TWa overlaps the voltage range of the second triangular wave signal TWb) is shorter than a sum of TDa, TDb, Tr, and Tf (i.e., TDa+TDb+Tr+Tf, which is hereinafter referred to as a total delay time period), an effective output pulse is not output during each of the time periods Ta and Tb from an output terminal of the comparator circuit, and thus the step-up operation and the step-down operation are prevented.

There is a background method of increasing currents consumed by the comparator circuit to increase the operational speed and reduce the total delay time period of the comparator circuit. This method, however, contradicts the attempt to reduce electric power consumption by increasing the PWM control frequency. That is, if the electric power consumption by the comparator circuit is increased, reduction in electric power consumption may not be attained.

SUMMARY

The invention provides a DC-DC converting apparatus. In one example, a DC-DC converting apparatus includes a step-up and step-down circuit and a pulse-width modulation control circuit. The step-up and step-down circuit is configured to step-up and step-down an input voltage to generate and output a predetermined output voltage. The pulse-width modulation control circuit is configured to generate an error signal based on the predetermined output voltage and a predetermined reference voltage, first to third voltages, a first triangular wave signal varying between the first and second voltages, and a second triangular wave signal varying between the third voltage and a fourth voltage determined based on the first to third voltages. The pulse-width modulation control circuit is further configured to perform a comparison of the error signal with the first and second triangular wave signals, and to cause the step-up and step-down circuit to step-up and step-down the input voltage based on a result of the comparison. The first to fourth voltages satisfy $V1<V4<V2<V3$ and $V4=V3-(V2-V1)$, wherein V1 is the first voltage, V2 is the second voltage, V3 is the third voltage, and V4 is the fourth voltage. Further, at least one of the first to third voltages is variably set such that a time period in which the voltage ranges of the first and second triangular wave signals overlap, is longer than a delay time period caused by the comparison.

The invention further provides another DC-DC converting apparatus. In one example, this DC-DC converting apparatus includes a step-up and step-down circuit and a pulse-width modulation control circuit. The step-up and step-down circuit is configured to step-up and step-down an input voltage according to a control signal input to generate and output a predetermined output voltage. The pulse-width modulation control circuit is configured to generate an error signal indicating an error in the feedback voltage proportional to the predetermined output voltage and a predetermined reference voltage, first to third voltages, a first triangular wave signal used for stepping down the input voltage, and a second triangular wave signal used for stepping up the input voltage. The pulse-width modulation control circuit is further configured to compare the error signal with the first and second triangular wave signals, and to output the control signal to the step-up and step-down circuit based on the result of the comparison. Further, the pulse-width modulation control circuit includes a triangular wave generation circuit and a comparator circuit. The triangular wave generation circuit is configured to set the first to third voltages and a fourth voltage so as to satisfy $V1<V4<V2<V3$ and $V4=V3-(V2-V1)$, and to generate the first and second triangular wave signals, wherein V1 is the first voltage setting a lower limit voltage of the first triangular wave signal, V2 is the second voltage setting an upper limit voltage of the first triangular wave signal, V3 is the third voltage setting an upper limit voltage of the second triangular wave signal, and V4 is the fourth voltage setting a lower limit voltage of the second triangular wave signal. The comparator circuit is configured to compare the error signal with the first and second triangular wave signals. Further, at least one of the first to third voltages is variably set such that a time period in which the voltage ranges of the first and second triangular wave signals overlap is longer than a delay time period of the comparator circuit.

In the DC-DC converting apparatus, the triangular wave generation circuit may include a constant voltage generation circuit, a constant current source, a first triangular wave generation circuit, and a second triangular wave generation circuit. The constant voltage generation circuit may be configured to generate and output the first to third voltages. The constant current source may be configured to generate and output a predetermined constant current which is variably set to the desired constant voltage and used for setting respective gradients of the first and second triangular wave signals. The first triangular wave generation circuit may be configured to receive the first and second voltages and the predetermined constant current and to generate and output the first triangular wave signal. The second triangular wave generation circuit may be configured to receive the third voltage and the predetermined constant current and to generate and output the second triangular wave signal. In the DC-DC converting apparatus, at least one of the first to third voltages may be variably set.

In the DC-DC converting apparatus, the constant voltage generation circuit may include a first constant voltage source configured to generate and output the second voltage which is variably set to the desired constant voltage, a second constant voltage source configured to generate and output the third voltage, and a voltage dividing circuit configured to divide the second voltage in order to generate and output the first voltage.

In the DC-DC converting apparatus, the constant voltage generation circuit may include a first constant voltage source configured to generate and output the second voltage which is variably set to the desired constant voltage, a second constant voltage source configured to generate and output the third voltage, and a voltage dividing circuit configured to divide the third voltage to generate and output the first voltage.

In the DC-DC converting apparatus, the constant voltage generation circuit may include a first constant voltage source configured to generate and output the second voltage which is variably set to the desired constant voltage, a second constant voltage source configured to generate and output the third voltage, and a third constant voltage source configured to generate and output the first voltage.

In the DC-DC converting apparatus, the predetermined constant current output from the constant current source may be variably set such that frequencies of the first and second triangular wave signals are kept constant at predetermined values.

The invention further provides a DC-DC converting method for stepping up and stepping down an input voltage to generate and output a predetermined output voltage. In one example, a DC-DC converting method for stepping up and stepping down an input voltage to generate and output a predetermined output voltage includes: generating an error signal based on the predetermined output voltage and a predetermined reference voltage; generating first to third voltages; generating a first triangular wave signal varying between the first and second voltages and a second triangular wave signal varying between the third voltage and a fourth voltage based on the first to third voltages; setting the first to fourth voltages so as to satisfy V1<V4<V2<V3 and V4=V3−(V2−V1), wherein V1 is the first voltage, V2 is the second voltage, V3 is the third voltage, and V4 is the fourth voltage; comparing the error signal with the first and second triangular wave signals; and stepping up and stepping down the input voltage based on a result of the comparison. In this method, at least one of the first to third voltages V1 to V3 is variably set such that a time period in which voltage ranges of the first and second triangular wave signals overlap with each other is longer than a delay time period caused by the comparison.

The invention also provides another DC-DC converting method for stepping up and stepping down an input voltage to generate and output a predetermined output voltage. In one example, this DC-DC converting method for stepping up and stepping down an input voltage to generate and output a predetermined output voltage includes: providing a step-up and step-down circuit and a pulse-width modulation control circuit; providing a triangular wave generation circuit and a comparator circuit in the pulse-width modulation control circuit; causing the pulse-width modulation control circuit to generate an error signal indicating an error in the feedback voltage which is proportional to the predetermined output voltage and a predetermined reference voltage; causing the triangular wave generation circuit to set first to fourth voltages so as to satisfy V1<V4<V2<V3 and V4=V3−(V2−V1), and to generate a first triangular wave signal used for stepping down the input voltage and a second triangular wave signal used for stepping up the input voltage, wherein V1 is the first voltage setting a lower limit voltage of the first triangular wave signal, V2 is the second voltage setting an upper limit voltage of the first triangular wave signal, V3 is the third voltage setting an upper limit voltage of the second triangular wave signal, and V4 is the fourth voltage setting a lower limit voltage of the second triangular wave signal; causing the comparator circuit to compare the error signal with the first and second triangular wave signals; and causing the step-up and step-down circuit to step-up and step-down the input voltage based on a result of the comparison. In this method, at least one of the first to third voltages is variably set such that a time period in which the voltage ranges of the first and second triangular wave signals overlap is longer than a delay time period of the comparator circuit.

The DC-DC converting method may further include, in the triangular wave generation circuit, a constant voltage generation circuit configured to generate and output the first to third voltages, a constant current source configured to generate and output a predetermined constant current which is variably set and used for setting the respective gradients of the first and second triangular wave signals, a first triangular wave generation circuit configured to receive the first and second voltages and the predetermined constant current and to generate and output the first triangular wave signal, and a second triangular wave generation circuit configured to receive the third voltage and the predetermined constant current and to generate and output the second triangular wave signal, and to variably set at least one of the first to third voltages.

The DC-DC converting method may further include, in the constant voltage generation circuit, a first constant voltage source configured to generate and output the second voltage which is variably set to the desired constant voltage, a second constant voltage source configured to generate and output the third voltage, and a voltage dividing circuit configured to divide the second voltage to generate and output the first voltage.

The DC-DC converting method may further include, in the constant voltage generation circuit, a first constant voltage source configured to generate and output the second voltage which is variably set to the desired constant voltage, a second constant voltage source configured to generate and output the third voltage, and a voltage dividing circuit configured to divide the third voltage to generate and output the first voltage.

The DC-DC converting method may further include, in the constant voltage generation circuit, a first constant voltage source configured to generate and output the second voltage which is variably set, a second constant voltage source configured to generate and output the third voltage, and a third constant voltage source configured to generate and output the first voltage.

The DC-DC converting method may further include variably setting the predetermined constant current output from the constant current source such that frequencies of the first and second triangular wave signals are kept constant at predetermined values.

BRIEF DESCRIPTION OF THE DRAWINGS

A more complete appreciation of the disclosure and many of the advantages thereof are readily obtained as the same becomes better understood by reference to the following detailed description when considered in connection with the accompanying drawings, wherein.

DETAILED DESCRIPTION OF PREFERRED EMBODIMENTS

Figure 1:
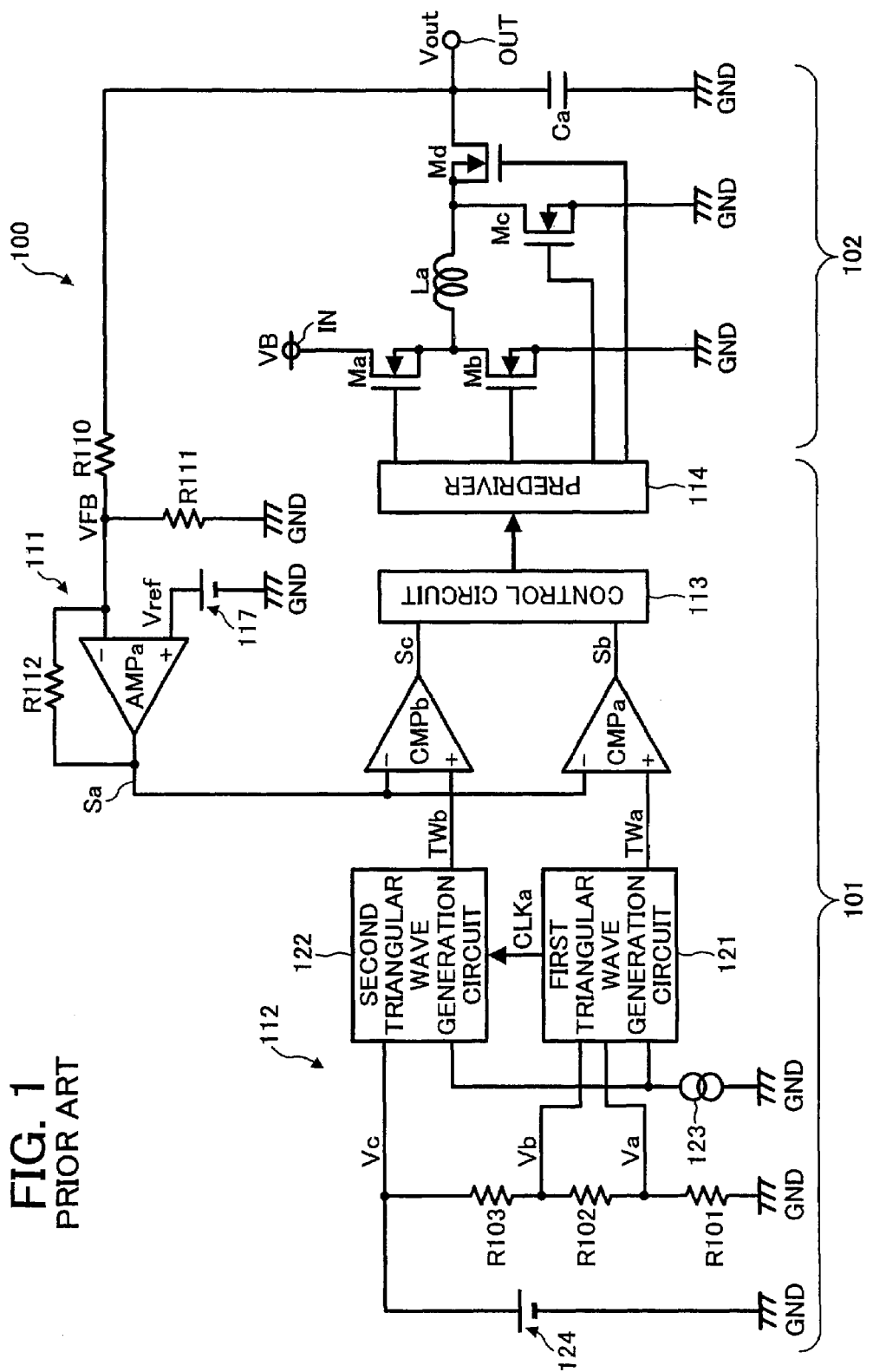
FIG. 1 is a circuit diagram illustrating a configuration of a background step-up and step-down DC-DC converter.
Figure 2:
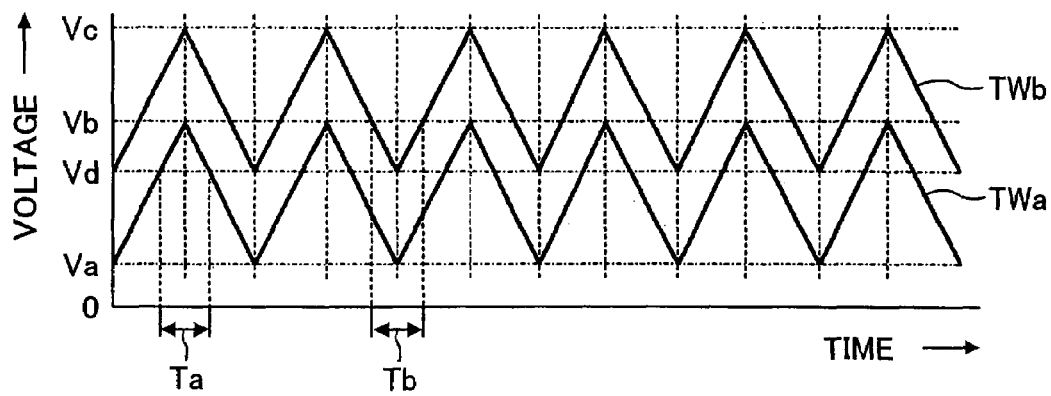
FIG. 2 is a timing diagram illustrating waveforms of first and second triangular wave signals generated in the step-up and step-down DC-DC converter of FIG. 1.
Figure 3:
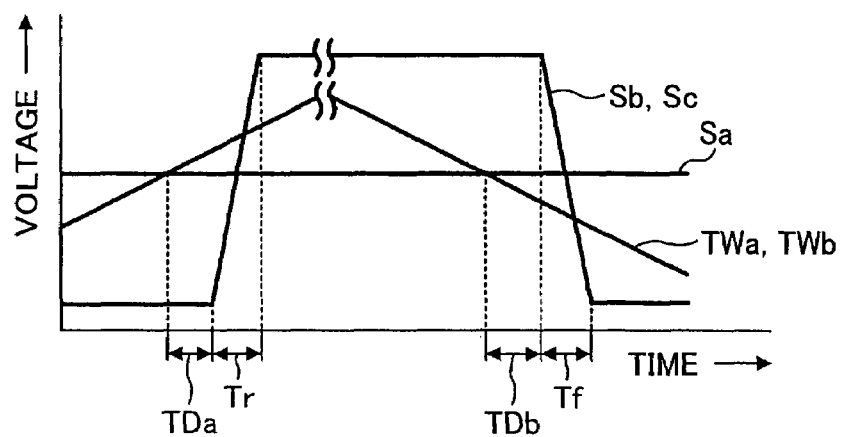
FIG. 3 is a timing diagram illustrating delay time periods of a step-down comparator circuit and a step-up comparator circuit used in the step-up and step-down DC-DC converter of FIG. 1.

In describing preferred embodiments illustrated in the drawings, specific terminology is employed for the purpose of clarity. However, the disclosure of this patent specification is not intended to be limited to the specific terminology so used and it is to be understood that substitutions for each specific element can include any technical equivalents that operate in a similar manner.

Figure 4:
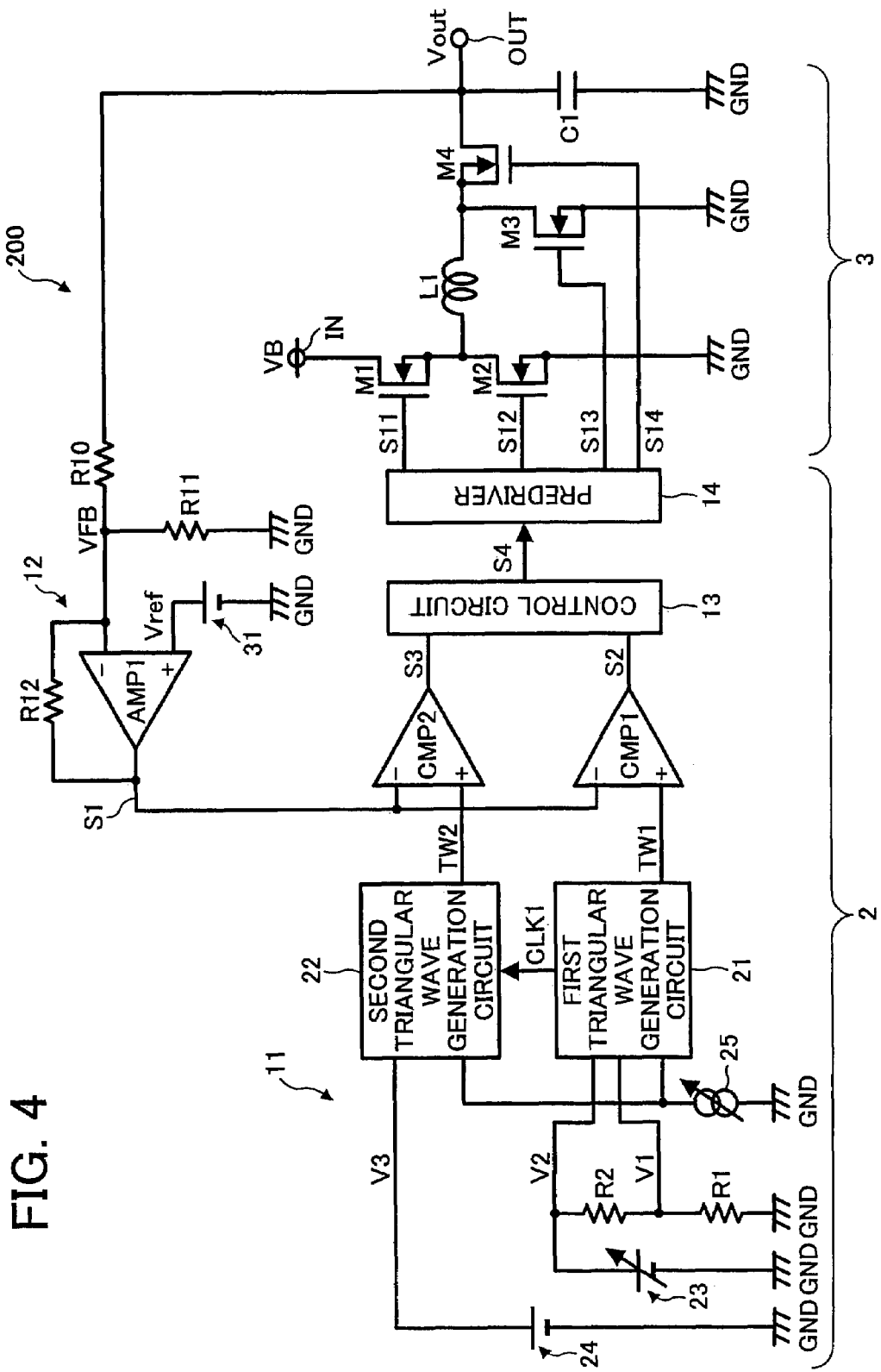
FIG. 4 is a circuit diagram illustrating a configuration of a step-up and step-down DC-DC converter according to an exemplary embodiment of the invention.

Referring now to the drawings, wherein like reference numerals designate identical or corresponding parts throughout the several views, more particularly to FIG. 4, which illustrates a configuration of a step-up and step-down DC-DC converter 200 according to an embodiment of the invention.

The step-up and step-down DC-DC converter 200 of FIG. 4 includes an input terminal IN, an output terminal OUT, a PWM control circuit 2, and a step-up and step-down circuit 3. The step-up and step-down DC-DC converter 200 receives an input voltage VB input from the input terminal IN, converts the input voltage VB to a predetermined constant voltage, and outputs the predetermined constant voltage from the output terminal OUT as an output voltage Vout.

The PWM control circuit 2 includes a triangular wave generation circuit 11, an error amplifier circuit 12, a step-down comparator circuit CMP1, a step-up comparator circuit CMP2, a control circuit 13, and a predriver 14.

The triangular wave generation circuit 11 includes a first triangular wave generation circuit 21, a second triangular wave generation circuit 22, a first constant voltage source 23, a second constant voltage source 24, a constant current source 25, and resistors R1 and R2. The first triangular wave generation circuit 21 generates a first triangular wave signal TW1 used for performing a step-down control, and the second triangular wave generation circuit 22 generates a second triangular wave signal TW2 used for performing a step-up control. The first constant voltage source 23 generates and outputs a second voltage V2 which is variably set to the desired constant voltage. The second constant voltage source 24 generates and outputs a predetermined third voltage V3. The constant current source 25 generates and outputs constant current which is variably set to the desired constant voltage. The resistors R1 and R2 divide the second voltage V2 to generate a first voltage V1. The step-down comparator circuit CMP1 and a step-up comparator circuit CMP2 form a comparator circuit. The first constant voltage source 23, the second constant voltage source 24, and the resistors R1 and R2 form a constant voltage generation circuit. The resistors R1 and R2 form a voltage dividing circuit.

The resistors R1 and R2 are connected in series between the ground (GND) and the first constant voltage source 23 which outputs the second voltage V2. The first triangular wave generation circuit 21 receives the second voltage V2 used for setting an upper limit voltage of the first triangular wave signal TW1, and the first voltage V1 used for setting a lower limit voltage of the first triangular wave signal TW1. The second triangular wave generation circuit 22 receives the third voltage V3 used for setting an upper limit voltage of the second triangular wave signal TW2, and a clock signal CLK1 output from the first triangular wave generation circuit 21 and used for synchronizing actions of the second triangular wave generation circuit 22. The first triangular wave generation circuit 21 and the second triangular wave generation circuit 22 receive constant current output from the constant current source 25 which are used for setting respective gradients of the first and second triangular wave signals TW1 and TW2. The first triangular wave signal TW1 output from the first triangular wave generation circuit 21 is input in a non-inverting input terminal of the step-down comparator circuit CMP1, while the second triangular wave signal TW2 output from the second triangular wave generation circuit 22 is input in a non-inverting input terminal of the step-up comparator circuit CMP2.

The error amplifier circuit 12 includes an operational amplifier circuit AMP1, a reference voltage generation circuit 31, resistors R10 and R11, and a feedback resistor R12. The reference voltage generation circuit 31 generates and outputs a predetermined reference voltage Vref. The resistors R10 and R11 divide the output voltage Vout and generate a feedback voltage VFB. The resistors R10 and R11 are connected in series between the output terminal OUT and the ground GND. An inverting input terminal of the operational amplifier circuit AMP1 is connected to a connection point between the resistors R10 and R11, while a non-inverting input terminal of the operational amplifier circuit AMP1 receives input of the reference voltage Vref. The feedback resistor R12 is connected between an output terminal of the operational amplifier circuit AMP1 and the inverting input terminal of the operational amplifier circuit AMP1. The output terminal of the operational amplifier circuit AMP1 is connected to the inverting input terminal of the step-down comparator circuit CMP1 and the inverting input terminal of the step-up comparator circuit CMP2. The operational amplifier circuit AMP1 compares the reference voltage Vref with the feedback voltage VFB, and generates and outputs an error signal S1 based on a result of the comparison.

The step-down comparator circuit CMP1 compares a voltage of the first triangular wave signal TW1 with a voltage of the error signal S1 and outputs a step-down mode switching signal S2, which is a binary signal indicating a result of the comparison, to the control circuit 13.

The step-up comparator circuit CMP2 compares a voltage of the second triangular wave signal TW2 with the voltage of the error signal S1 and outputs a step-up mode switching signal S3, which is a binary signal indicating a result of the comparison, to the control circuit 13.

The control circuit 13 outputs a step-up and step-down control signal S4 to the predriver 14 according to the step-down mode switching signal S2 and the step-up mode switching signal S3 input therein.

The predriver 14 drives switching elements M1 to M4 of the step-up and step-down circuit 3 according to the step-up and step-down control signal S4 input in the predriver 14 from the control circuit 13.

The step-up and step-down circuit 3 includes the switching elements M1 to M4, an inductor L1, and a capacitor C1. The switching elements M1 and M2 are NMOS (N-channel metal oxide semiconductor) transistors which perform a step-down control to the output voltage Vout. Meanwhile, the switching elements M3 and M4 are NMOS transistors which perform a step-up control to the output voltage Vout. The step-up and step-down circuit 3 performs a step-up operation and a step-down operation of the output voltage Vout according to switching signals S11 to S14 output from the predriver 14 of the PWM control circuit 2.

The switching element M1 and M2 are connected in series between the input terminal IN and the ground GND, while the switching elements M3 and M4 are connected in series between the output terminal OUT and the ground GND. The inductor L1 is connected between a connection point of the switching elements M1 and M2 and a connection point of the switching elements M3 and M4. The capacitor C1 is connected between the output terminal OUT and the ground GND. The switching signals S11 to S14 output from the predriver 14 are input in corresponding gates of the switching elements M1 to M4.

Operations of the step-up and step-down DC-DC converter 200 shown in FIG. 4 is described with reference to FIG. 5, which is a timing diagram illustrating the relationships between the first triangular wave signal TW1, the second triangular wave signal TW2, and the first to fourth voltages V1 to V4.

Figure 5:
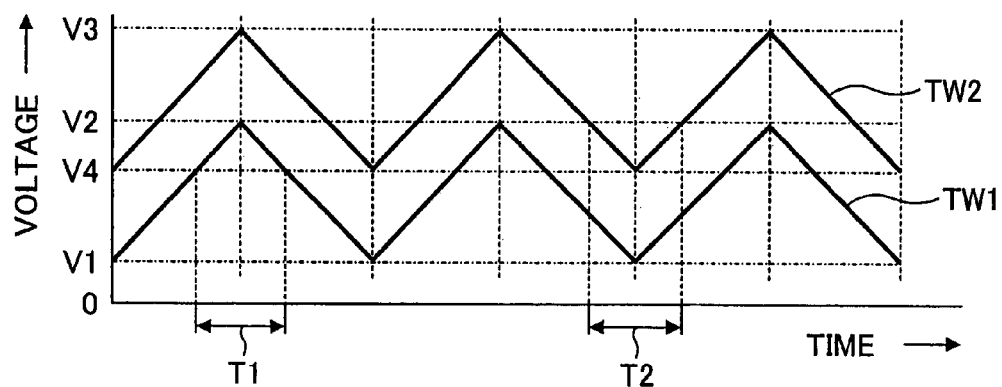
FIG. 5 is a timing diagram illustrating relationships between first and second triangular wave signals and first to fourth voltages generated in the step-up and step-down DC-DC converter of FIG. 4 according to an exemplary embodiment of the invention.

As illustrated in FIG. 5, the first triangular wave signal TW1 forms a waveform which varies between the first voltage V1 and the second voltage V2, while the second triangular wave signal TW2 forms a waveform which varies between the third voltage V3 and the fourth voltage V4.

The fourth voltage V4 shown in FIG. 5 is a lower limit voltage of the second triangular wave TW2. When the first triangular wave signal TW1 reaches the first voltage V1 (i.e., the lower limit voltage of the first triangular wave signal TW1), the first triangular wave generation circuit 21 outputs the clock signal CLK1 to the second triangular wave generation circuit 22. Upon input of the clock signal CLK1 to the second triangular wave generation circuit 22, the voltage of the second triangular wave signal TW2, which has been decreasing, starts to increase.

The gradients of the first and second triangular wave signals TW1 and TW2 are determined by a value of the constant current output from the constant current source 25. Therefore, the first and second triangular wave signals TW1 and TW2 have equal amplitudes. The fourth voltage V4 (i.e., the lower limit voltage of the second triangular wave signal TW2) is a voltage obtained by subtracting a voltage difference between the second and first voltages V2 and V1 from the third voltage V3. That is, the fourth voltage V4 is expressed as V4=V3−(V2−V1). The fourth voltage V4 should be lower than the second voltage V2 to smooth the switching between the step-up operation and the step-down operation performed in the step-up and step-down DC-DC converter 200. In other words, a voltage range of the first triangular wave signal TW1 used for the step-down control should partly overlap a voltage range of the second triangular wave signal TW2 used for the step-up control.

When the input voltage VB is lower than the output voltage Vout, a voltage of the error signal S1 output from the operational amplifier AMP1 falls between the second voltage V2 and the third voltage V3. Accordingly, the step-up comparator circuit CMP2 outputs the step-up mode switching signal S3 to the control circuit 13, and the step-up operation is performed to control the output voltage Vout to a predetermined level. When the output voltage Vout decreases, the voltage of the error signal S1 increases, and the step-up operation is performed to control the output voltage Vout to increase up to a predetermined level.

When the input voltage VB is higher than the output voltage Vout, on the other hand, the voltage of the error signal S1 falls between the first voltage V1 and the fourth voltage V4. Accordingly, the step-down comparator circuit CMP1 outputs the step-down mode switching signal S2 to the control circuit 13, and the step-down operation is performed to control the output voltage Vout to a predetermined level. When the output voltage Vout decreases, the voltage of the error signal S1 decreases, and the step-down operation is performed to control the output voltage Vout to increase up to a predetermined level.

When the input voltage VB and the output voltage Vout are at an approximately equal level, the voltage of the error signal S1 falls between the fourth voltage V4 and the second voltage V2. Accordingly, the step-down comparator circuit CMP1 outputs the step-down mode switching signal S2 to the control circuit 13, and the step-up comparator circuit CMP2 outputs the step-up mode switching signal S3 to the control circuit 13. As a result, the step-up operation and the step-down operation are performed, respectively, to control the output voltage Vout to be at a predetermined level.

Figure 6:
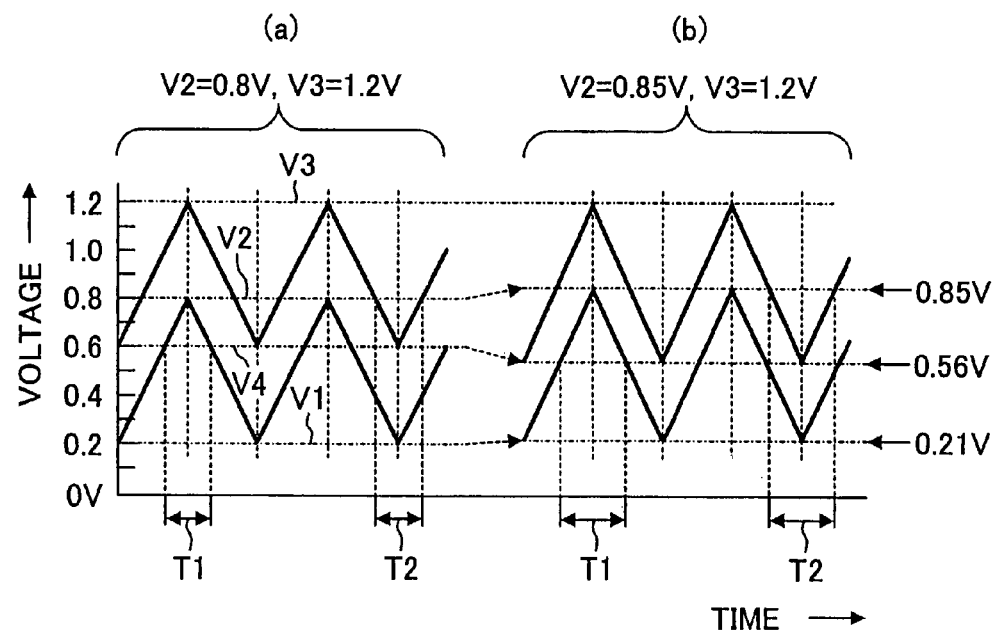
FIG. 6 provides timing diagrams illustrating changes of the first and second triangular wave signals generated in the step-up and step-down DC-DC converter of FIG. 4 according to an exemplary embodiment of the invention.

FIGS. 6(*a*) and 6(*b*) illustrate changes of the first triangular wave signal TW1 and the second triangular wave signal TW2 generated in the step-up and step-down DC-DC converter 200 of FIG. 4. FIG. 6(*a*) illustrates an example of an initial state in which the second voltage V2 (i.e., the output voltage output from the first constant voltage source 23) is set at 0.8 volts, and the first voltage V1 is set at 0.2 volts, for example. Further, the third voltage V3 (i.e., the output voltage output from the second constant voltage source 24) is set at 1.2 volts, for example. In this case, the fourth voltage V4 becomes 0.6 volts according to the above equation V4=V3−(V2−V1), and a voltage range in which the voltage range of the first triangular wave signal TW1 overlaps the voltage range of the second triangular wave signal TW2 is 0.2 volts (i.e., 0.8−0.6=0.2).

FIG. 6(*b*) illustrates a state in which the second voltage V2 is increased from 0.8 volts to 0.85 volts. In this case, the first voltage V1 increases to 0.21 volts, and the third voltage V3 stays unchanged at 1.2 volts. The fourth voltage V4 becomes 0.56 volts according to the above equation V4=V3−(V2−V1). Accordingly, the voltage range in which the voltage range of the first triangular wave signal TW1 overlaps the voltage range of the second triangular wave signal TW2 is 0.29 volts (i.e., 0.85−0.56=0.29), which is 0.09 volts larger than 0.2 volts of the initial state.

As observed from FIGS. 6(*a*) and 6(*b*), time periods T1 and T2, in which the voltage range of the first triangular wave signal TW1 overlaps with the voltage range of the second triangular wave signal TW2 are respectively longer in FIG. 6(*b*) than in FIG. 6(*a*). If an output voltage output from the first constant voltage source 23 is increased, the PWM control frequency slightly decreases but can be restored by adjusting the value of the constant current output from the constant current source 25.

Figure 7:
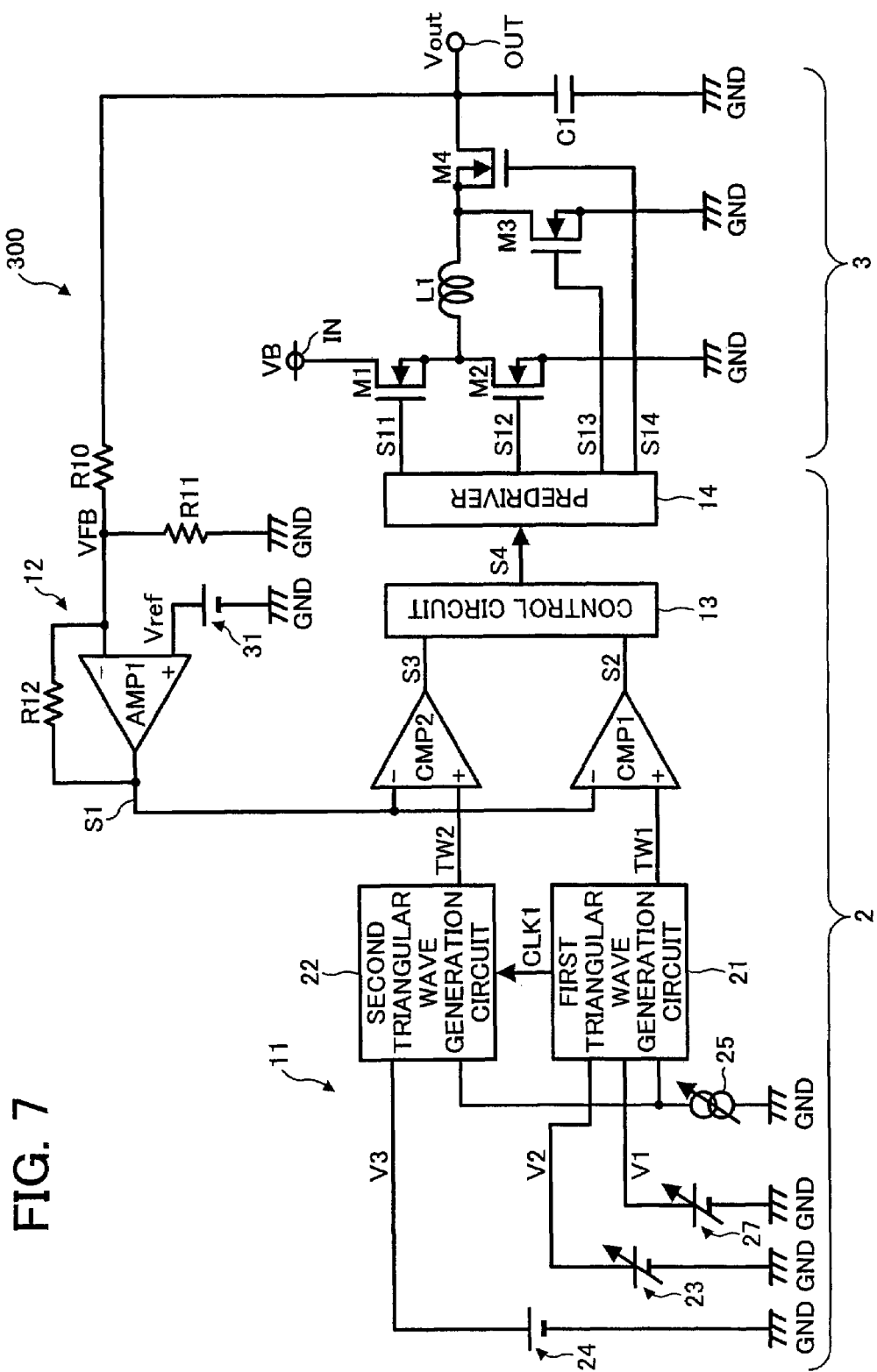
FIG. 7 is a circuit diagram illustrating a configuration of a step-up and step-down DC-DC converter according to an exemplary embodiment of the invention.

FIG. 7 illustrates a configuration of a step-up and step-down DC-DC converter 300 according to another exemplary embodiment of the invention. A detailed description is omitted for the components shown in FIG. 7, which were described with reference to FIG. 4. However, the differences between the step-up and step-down DC-DC converter 200 of FIG. 4 and the step-up and step-down DC-DC converter 300 of FIG. 7 are described. The step-up and step-down DC-DC converter 300 is different from the step-up and step-down DC-DC converter 200 in that the resistors R1 and R2 are replaced by a third constant voltage source 27 in the step-up and step-down DC-DC converter 300. In this case, the third constant voltage source 27 generates and outputs the first voltage V1 which is variably set to the desired voltage. The first constant voltage source 23, the second constant voltage source 24, and the third constant voltage source 27 form a constant voltage generation circuit. With this configuration, the step-up and step-down DC-DC converter 300 can provide similar operation of the step-up and step-down DC-DC converter 200.

As described above, in the step-up and step-down DC-DC converters 200 and 300, the value of the second voltage V2 output from the first constant voltage source 23 is set such that the time periods T1 and T2, in which the voltage range of the first triangular wave signal TW1 overlaps the voltage range of the second triangular wave signal TW2, are longer than the delay time periods of the step-down comparator circuit CMP1 and the step-up comparator circuit CMP2. Accordingly, the step-up operation and the step-down operation of the output voltage Vout can be performed even during the time periods T1 and T2 in which the voltage range of the first triangular wave signal TW1 overlaps the voltage range of the second triangular wave signal TW2. As a result, the output voltage Vout can be stabilized.

A constant voltage source outputting a constant voltage which is variably set to the desired constant voltage may be used as the second constant voltage source 24 in the step-up and step-down DC-DC converters 200 and 300. With this configuration, the third voltage V3 may be decreased to extend the time periods T1 and T2, in which the voltage range of the first triangular wave signal TW1 overlaps the voltage range of the second triangular wave signal TW2. In this case, however, the highest voltage within a voltage range of the error signal S1 is decreased, and thus this method of decreasing the third voltage V3 to increase the time periods T1 and T2 is limited to when the error signal S1 has a relatively sufficient voltage range.

The first voltage V1 is generated by dividing the second voltage V2 in the step-up and step-down DC-DC converters 200. Alternatively, the first voltage V1 may be generated by dividing the third voltage V3, as in a step-up and step-down DC-DC converters 400 according to another embodiment.

Figure 8:
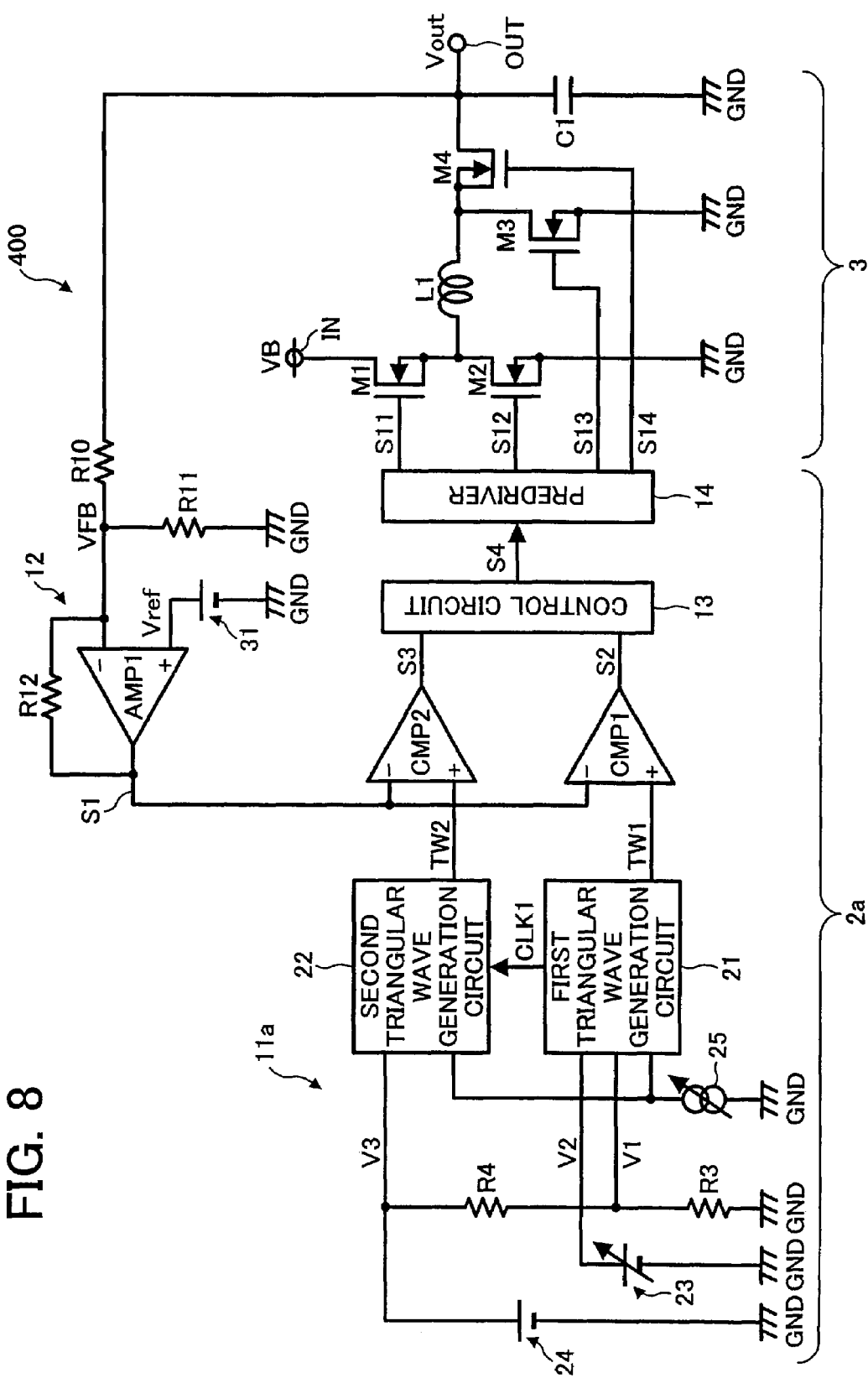
FIG. 8 is a circuit diagram illustrating a configuration of a step-up and step-down DC-DC converter according to another exemplary embodiment of the invention.

FIG. 8 illustrates a configuration of the step-up and step-down DC-DC converters 400. A detailed description is omitted for the components shown in FIG. 8, which were described with reference to FIG. 4. However, the differences between the step-up and step-down DC-DC converters 200 of FIG. 4 and the step-up and step-down DC-DC converter 400 of FIG. 8 are described. The step-up and step-down DC-DC converter 400 is different from the step-up and step-down DC-DC converters 200 in that the resistors R1 and R2 of the step-up and step-down DC-DC converter 200 are replaced by resistors R3 and R4 which divide the third voltage V3 to generate the first voltage V1.

The step-up and step-down DC-DC converter 400 includes the input terminal IN, the output terminal OUT, a PWM control circuit 2a, and the step-up and the step-down circuit 3.

The PWM control circuit 2a includes a triangular wave generation circuit 11a, the error amplifier circuit 12, the step-down comparator circuit CMP1, the step-up comparator circuit CMP2, the control circuit 13, and the predriver 14.

The triangular wave generation circuit 11a includes the first triangular wave generation circuit 21, the second triangular wave generation circuit 22, the first constant voltage source 23, the second constant voltage source 24, the constant current source 25, and the resistors R3 and R4. The first constant voltage source 23, the second constant voltage source 24, and the resistors R3 and R4 form a constant voltage generation circuit. The resistors R3 and R4 form a voltage dividing circuit.

The resistors R3 and R4 are connected in series between the ground GND and the second constant voltage source 24 which outputs the third voltage V3. The first triangular wave generation circuit 21 receives the second voltage V2 used for setting the upper limit voltage of the first triangular wave signal TW1, and the first voltage V1 which is generated by dividing the third voltage V3 with the resistors R3 and R3 and which is used for setting the lower limit voltage of the first triangular wave signal TW1.

Figure 9:
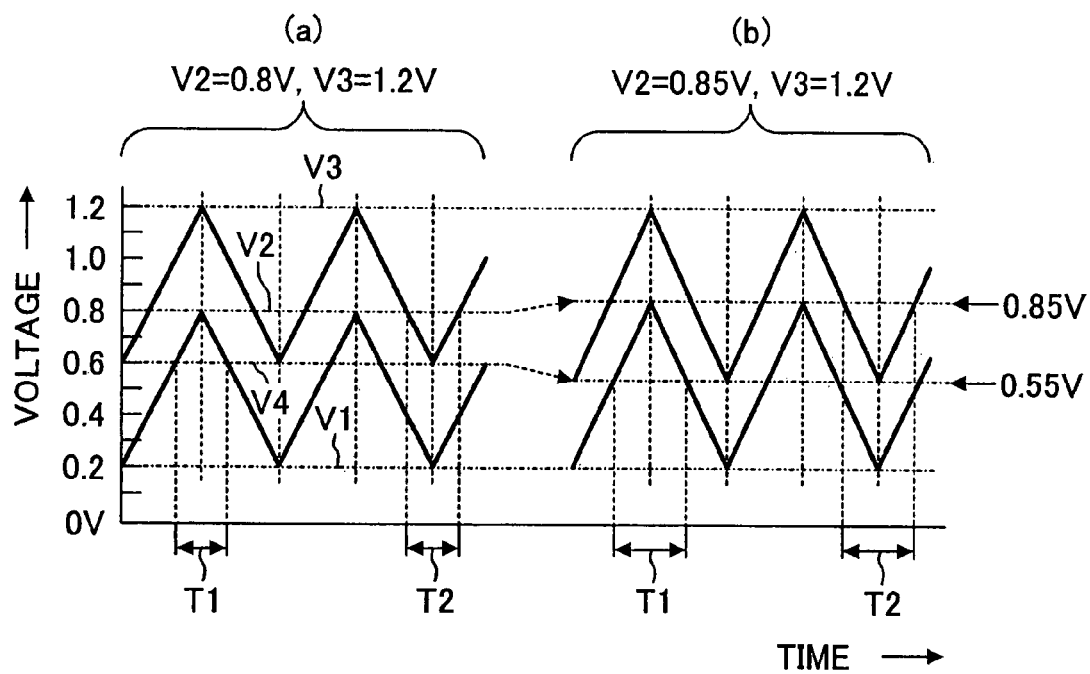
FIG. 9 provides timing diagrams illustrating changes of the first and second triangular wave signals generated in the step-up and step-down DC-DC converter of FIG. 8 according to another exemplary embodiment of the invention.

FIGS. 9(a) and 9(b) illustrate changes of the first triangular wave signal TW1 and the second triangular wave signal TW2 generated in the step-up and step-down DC-DC converter 400 of FIG. 8. FIG. 9(a) illustrates an example of an initial state in which the third voltage V3 (i.e., the output voltage output from the second constant voltage source 24) is set at 1.2 volts, and the first voltage V1 is set at 0.2 volts, for example. Further, the second voltage V2 (i.e., the output voltage output from the first constant voltage source 23) is set at 0.8 volts, for example. In this case, the fourth voltage V4 becomes 0.6 volts according to the equation V4=V3−(V2−V1), and a voltage range in which the voltage range of the first triangular wave signal TW1 overlaps the voltage range of the second triangular wave signal TW2 is 0.2 volts (i.e., 0.8−0.6=0.2).

FIG. 9(b) illustrates a state in which the second voltage V2 is increased from 0.8 volts to 0.85 volts. In this case, the first voltage V1 and the third voltage V3 stay unchanged at 0.2 volts and 1.2 volts, respectively. The fourth voltage V4 becomes 0.55 volts according to the above equation V4=V3−(V2−V1). Accordingly, the voltage range in which the voltage range of the first triangular wave signal TW1 overlaps the voltage range of the second triangular wave signal TW2 is 0.3 volts (i.e., 0.85−0.55=0.3), which is 0.1 volts larger than the 0.2 volts of the initial state.

As observed from FIGS. 9(a) and 9(b), the time periods T1 and T2, in which the voltage range of the first triangular wave signal TW1 overlaps the voltage range of the second triangular wave signal TW2 are respectively longer in FIG. 9(b) than in FIG. 9(a). If the output voltage output from the first constant voltage source 23 is increased, the PWM control frequency decreases, as in the case of the step-up and step-down DC-DC converter 200 shown in FIG. 4. Therefore, variation in the PWM control frequency is cancelled out by increasing the value of the constant current output from the constant current source 25.

Figure 10:
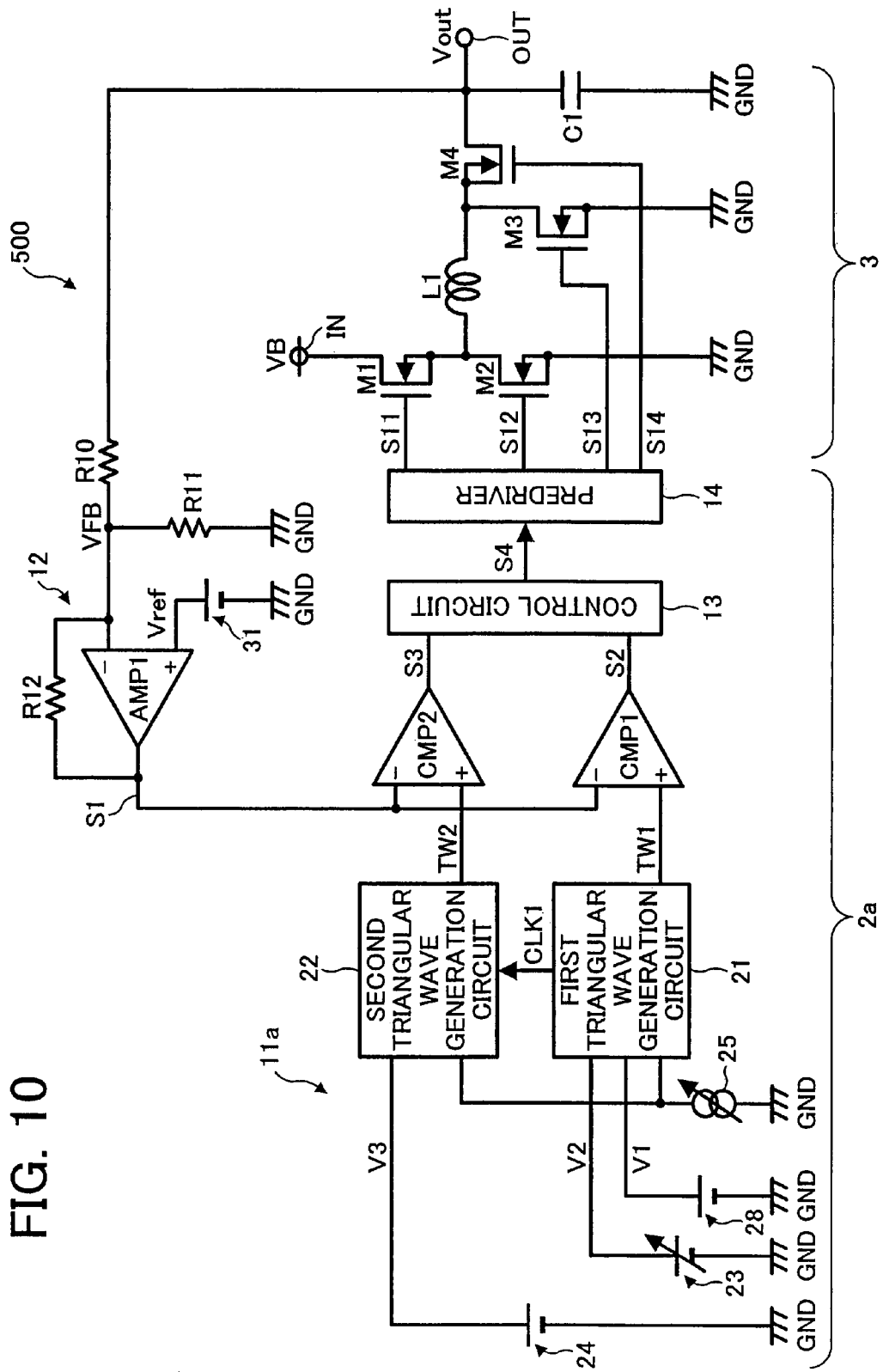
FIG. 10 is a circuit diagram illustrating a configuration of a step-up and step-down DC-DC converter according to an exemplary embodiment of the invention.

FIG. 10 illustrates a configuration of a step-up and step-down DC-DC converter 500 according to another embodiment of the invention. A detailed description is omitted for the components shown in FIG. 10 which were described with reference to FIGS. 4 and 8. However, the differences between the step-up and step-down DC-DC converter 400 of FIG. 8 and the step-up and step-down DC-DC converter 500 of FIG. 10 are described. The step-up and step-down DC-DC converter 500 is different from the a step-up and step-down DC-DC converter 400 in that the resistors R3 and R4 are replaced by a third constant voltage source 28 in the step-up and step-down DC-DC converter 500. The third constant voltage source 28 generates and outputs the first voltage V1. The first constant voltage source 23, the second constant voltage source 24, and the third constant voltage source 28 form a constant voltage generation circuit. With this configuration, the step-up and step-down DC-DC converter 500 can provide similar operations of the step-up and step-down DC-DC converter 400.

As described above, in the step-up and step-down DC-DC converter 400, the first voltage V1 is generated by dividing the third voltage V3. Accordingly, the step-up and step-down DC-DC converter 400 can provide a similar effect to that of the step-up and step-down DC-DC converter 200.

Further, a constant voltage source outputting a constant voltage which is variably set to the desired constant voltage may be used as the second constant voltage source 24 in the step-up and step-down DC-DC converters 400 and 500. With this configuration, the third voltage V3 may be decreased to increase the time periods T1 and T2, in which the voltage range of the first triangular wave signal TW1 overlaps the voltage range of the second triangular wave signal TW2. In this case, however, the highest voltage within a voltage range of the error signal S1 is decreased, and thus this method of decreasing the third voltage V3 to increase the time periods T1 and T2 is limited to when the error signal S1 has a relatively sufficient voltage range.

Two constant voltage sources are used in each of the step-up and step-down DC-DC converters 200 and 400. Alternatively, the third voltage V3 may be generated from the first voltage V1 by using a constant voltage source outputting a constant voltage which is variably set to the desired constant voltage and at least three resistors that divide the output voltage output from the constant voltage source. Further, the step-up and step-down DC-DC converter may be provided with a constant voltage source which generates the first voltage V1, constant voltage sources which respectively generate the second voltage V2 and the third voltage V3 which are variably set to the desired constant voltage, and series-connected resistors. If more than one constant voltage sources are provided in the step-up and step-down DC-DC converter, the first to third voltages V1 to V3 change in values, depending on which constant voltage source is configured to output a constant voltage which is variably set to the desired constant voltage. Circuits used in the step-up and step-down DC-DC converter should be appropriately chosen according to purposes.

The above-described embodiments are illustrative, and numerous additional modifications and variations are possible in light of the above teachings. For example, elements and/or features of different illustrative and exemplary embodiments herein may be combined with each other and/or substituted for each other within the scope of this disclosure and appended claims. It is therefore to be understood that within the scope of the appended claims, the disclosure of this patent specification may be practiced otherwise than as specifically described herein.

What is claimed is:

1. A DC-DC converting apparatus comprising:
a step-up and step-down circuit configured to step-up and step-down an input voltage to generate and output a predetermined output voltage; and
a pulse-width modulation control circuit configured to:
generate an error signal based on the predetermined output voltage and a predetermined reference voltage, first to third voltages, a first triangular wave signal varying between the first and second voltages, and a second triangular wave signal varying between the third voltage and a fourth voltage, determined based on the first to third voltages,
perform a comparison of the error signal with the first and second triangular wave signals, and
cause the step-up and step-down circuit to step-up and step-down the input voltage based on a result of the comparison,
wherein at least one of the first to third voltages is variably set such that a time period in which voltage ranges of the first and second triangular wave signals overlap is longer than a delay time period caused by the comparison.

2. A DC-DC converting apparatus comprising:
a step-up and step-down circuit configured to step-up and step-down an input voltage according to a control signal input therein to generate and output a predetermined output voltage; and
a pulse-width modulation control circuit configured to:
generate an error signal indicating an error in a feedback voltage proportional to the predetermined output voltage and a predetermined reference voltage, first to third voltages, a first triangular wave signal configured for stepping down the input voltage, and a second triangular wave signal configured for stepping up the input voltage,
compare the error signal with the first and second triangular wave signals, and
output the control signal to the step-up and step-down circuit based on a result of the comparison,
wherein at least one of the first to third voltages is variably set such that a time period in which voltage ranges of the first and second triangular wave signals overlap is longer than a delay time period of the comparator circuit.

3. The DC-DC converting apparatus as described in claim 2, wherein the triangular wave generation circuit comprises:
a constant voltage generation circuit configured to generate and output the first to third voltages;
a constant current source configured to generate and output predetermined constant current which is variably set and used for setting respective gradients of the first and second triangular wave signals;
a first triangular wave generation circuit configured to receive the first and second voltages and the predetermined constant current and to generate and output the first triangular wave signal; and
a second triangular wave generation circuit configured to receive the third voltage and the predetermined constant current and to generate and output the second triangular wave signal,
wherein at least one of the first to third voltages is variably set.

4. The DC-DC converting apparatus as described in claim 3, wherein the constant voltage generation circuit comprises:
a first constant voltage source configured to generate and output the second voltage which is variably set;
a second constant voltage source configured to generate and output the third voltage; and
a voltage dividing circuit configured to divide the second voltage to generate and output the first voltage.

5. The DC-DC converting apparatus as described in claim 3, wherein the constant voltage generation circuit comprises:
a first constant voltage source configured to generate and output the second voltage which is variably set;
a second constant voltage source configured to generate and output the third voltage; and
a voltage dividing circuit configured to divide the third voltage to generate and output the first voltage.

6. The DC-DC converting apparatus as described in claim 3, wherein the constant voltage generation circuit comprises:
a first constant voltage source configured to generate and output the second voltage which is variably set;
a second constant voltage source configured to generate and output the third voltage; and
a third constant voltage source configured to generate and output the first voltage.

7. The DC-DC converting apparatus as described in claim 3, wherein the predetermined constant current output from the constant current source is variably set such that frequencies of the first and second triangular wave signals are kept constant at predetermined values.

8. A DC-DC converting apparatus comprising:
   step-up and step-down means for stepping up and stepping down an input voltage to generate and output a predetermined output voltage; and
   pulse-width modulation control means for:
      generating an error signal based on the predetermined output voltage and a predetermined reference voltage, first to third voltages, a first triangular wave signal varying between the first and second voltages, and a second triangular wave signal varying between the third voltage and a fourth voltage determined based on the first to third voltages,
      performing a comparison of the error signal with the first and second triangular wave signals, and
      causing the step-up and step-down circuit to step-up and step-down the input voltage based on a result of the comparison,
      wherein at least one of the first to third voltages is variably set such that a time period in which voltage ranges of the first and second triangular wave signals overlap is longer than a delay time period caused by the comparison.

9. A DC-DC converting apparatus comprising:
   step-up and step-down means for stepping up and stepping down an input voltage according to a control signal input therein to generate and output a predetermined output voltage; and
   pulse-width modulation control means for:
      generating an error signal indicating an error in a feedback voltage proportional to the predetermined output voltage and a predetermined reference voltage, first to third voltages, a first triangular wave signal used for stepping down the input voltage, and a second triangular wave signal used for stepping up the input voltage,
      comparing the error signal with the first and second triangular wave signals, and
      outputting the control signal to the step-up and step-down circuit based on a result of the comparison,
      wherein at Least one of the first to third voltages is variably set such that a time period in which voltage ranges of the first and second triangular wave signals overlap is longer than a delay time period of the comparator means.

10. The DC-DC converting apparatus as described in claim 9, wherein the triangular wave generation means comprises:
    constant voltage generation means for generating and outputting the first to third voltages;
    constant current source means for generating and outputting predetermined constant current which is variably set and used for setting respective gradients of the first and second triangular wave signals;
    first triangular wave generation means for receiving the first and second voltages and the predetermined constant current, and for generating and outputting the first triangular wave signal; and
    second triangular wave generation means for receiving the third voltage and the predetermined constant current, and for generating and outputting the second triangular wave signal,
    wherein at least one of the first to third voltages is variably set.

11. The DC-DC converting apparatus as described in claim 10, wherein the constant voltage generation means comprises:
    first constant voltage source means for generating and outputting the second voltage which is variably set;
    second constant voltage source means for generating and outputting the third voltage; and
    voltage dividing means for dividing the second voltage to generate and output the first voltage.

12. The DC-DC converting apparatus as described in claim 10, wherein the constant voltage generation means comprises:
    first constant voltage source means for generating and outputting the second voltage which is variably set
    second constant voltage source means for generating and outputting the third voltage; and
    voltage dividing means for dividing the third voltage to generate and output the first voltage.

13. The DC-DC converting apparatus as described in claim 10, wherein the constant voltage generation means comprises:
    first constant voltage source means for generating and outputting the second voltage which is variably set;
    second constant voltage source means for generating and outputting the third voltage; and
    third constant voltage source means for generating and outputting the first voltage.

14. The DC-DC converting apparatus as described in claim 10, wherein the predetermined constant current output from the constant current source means is variably set such that frequencies of the first and second triangular wave signals are kept constant at predetermined values.

15. A DC-DC converting method for stepping up and stepping down an input voltage to generate and output a predetermined output voltage, the DC-DC converting method comprising the steps of:
    generating an error signal based on the predetermined output voltage and a predetermined reference voltage;
    generating first to third voltages;
    generating a first triangular wave signal varying between the first and second voltages and a second triangular wave signal varying between the third voltage and a fourth voltage determined based on the first to third voltages;
    comparing the error signal with the first arid second triangular wave signals; and
    stepping up and stepping down the input voltage based on a result of the comparison,
    wherein at least one of the first to third voltages is variably set such that a time period in which voltage ranges of the first and second triangular wave signals overlap is longer than a delay time period caused by the comparison.

16. A DC-DC converting method for stepping up and stepping down an input voltage to generate and output a predetermined output voltage, the DC-DC converting method comprising the steps of:
    providing a step-up and step-down circuit and a pulse-width modulation control circuit;
    providing a triangular wave generation circuit and a comparator circuit in the pulse-width modulation control circuit;
    causing the pulse-width modulation control circuit to generate an error signal indicating an error in a feedback voltage proportional to the predetermined output voltage and a predetermined reference voltage;
    generating a first triangular wave signal used for stepping down the input voltage and a second triangular wave signal used for stepping up the input voltage,
    causing the comparator circuit to compare the error signal with the first and second triangular wave signals; and causing the step-up and step-down circuit to step-up and step-down the input voltage based on a result of the comparison, wherein at least one of the first to third voltages is variably set such that a time period in which voltage ranges of the first and second triangular wave signals overlap is longer than a delay time period of the comparator circuit.

17. The DC-DC converting method as described in claim 16, further comprising the step of:
including, in the triangular wave generation circuit:
a constant voltage generation circuit configured to generate and output the first to third voltages,
a constant current source configured to generate and output predetermined constant current which is variably set and used for setting respective gradients of the first and second triangular wave signals,
a first triangular wave generation circuit configured to receive the first and second voltages and the predetermined constant current and to generate and output the first triangular wave signal, and
a second triangular wave generation circuit configured to receive the third voltage and the predetermined constant current and to generate and output the second triangular wave signal; and
variably setting at least one of the first to third voltages.

18. The DC-DC converting method as described in claim 17, further comprising the step of:
including, in the constant voltage generation circuit:
a first constant voltage source configured to generate and output the second voltage which is variably set,
a second constant voltage source configured to generate and output the third voltage, and
a voltage dividing circuit configured to divide the second voltage to generate and output the first voltage.

19. The DC-DC converting method as described in claim 17, further comprising the step of:
including, in the constant voltage generation circuit:
a first constant voltage source configured to generate and output the second voltage which is variably set,
a second constant voltage source configured to generate and output the third voltage, and
a voltage dividing circuit configured to divide the third voltage to generate and output the first voltage.

20. The DC-DC converting method as described in claim 17, further comprising the step of:
including, in the constant voltage generation circuit:
a first constant voltage source configured to generate and output the second voltage which is variably set,
a second constant voltage source configured to generate and output the third voltage, and
a third constant voltage source configured to generate and output the first voltage.

21. The DC-DC converting method as described in claim 17, further comprising the step of:
variably setting the predetermined constant current output from the constant current source such that frequencies of the first and second triangular wave signals are kept constant at predetermined values.

22. A DC-DC converting apparatus comprising:
a step-up and step-down circuit configured to step-up and step-down an input voltage to generate and output a predetermined output voltage; and
a pulse-width modulation control circuit configured to:
generate an error signal based on the predetermined output voltage and a predetermined reference voltage and the first to third voltages, a first triangular wave signal, and a second triangular wave signal,
perform a comparison of the error signal with the first and second triangular wave signals, and
cause the step-up and step-down circuit to step-up and step-down the input voltage based on a result of the comparison,
wherein at least one of the first to third voltages is variably set such that a time period in which voltage ranges of the first and second triangular wave signals overlap is longer than a delay time period caused by the comparison.

* * * * *